United States Patent
Chen et al.

(10) Patent No.: US 7,649,422 B2
(45) Date of Patent: Jan. 19, 2010

(54) REAL TIME CLOCK INTEGRATED CIRCUIT AND ELECTRONIC APPARATUS USING THE SAME

(75) Inventors: Hong-Chu Chen, Hsinchu (TW); Jiann-Ming Shiau, Nantou County (TW)

(73) Assignee: Novatek Microelectronics Corp., Hsinchu (TW)

( * ) Notice: Subject to any disclaimer, the term of this patent is extended or adjusted under 35 U.S.C. 154(b) by 28 days.

(21) Appl. No.: 11/767,527

(22) Filed: Jun. 25, 2007

(65) Prior Publication Data
US 2008/0246549 A1    Oct. 9, 2008

(30) Foreign Application Priority Data
Apr. 9, 2007    (TW) ............... 96112238 A

(51) Int. Cl.
*H03L 7/00*    (2006.01)
(52) U.S. Cl. .............. 331/34; 331/65; 331/176
(58) Field of Classification Search ........... 331/44, 331/57, 65, 66, 143, 145, 153, 172, 173, 331/175, 176; 327/141–145, 151, 160, 162; 713/320, 322, 323; 455/343.1–343.6; 368/118, 368/156, 159, 168
See application file for complete search history.

(56) References Cited

U.S. PATENT DOCUMENTS

| | | | |
|---|---|---|---|
| 5,771,180 A * | 6/1998 | Culbert | 702/130 |
| 5,845,204 A | 12/1998 | Chapman et al. | |
| 6,873,215 B2 | 3/2005 | Devries et al. | |
| 2003/0034848 A1* | 2/2003 | Norman et al. | 331/46 |
| 2004/0063473 A1* | 4/2004 | Devries et al. | 455/572 |
| 2007/0069827 A1* | 3/2007 | Haiut | 331/57 |

* cited by examiner

*Primary Examiner*—James H. Cho
*Assistant Examiner*—Jany Tran
(74) *Attorney, Agent, or Firm*—Jianq Chyun IP Office

(57) ABSTRACT

A real time clock integrated circuit (RTC IC) and an electronic apparatus thereof are provided. In the RTC IC, only a low-power oscillator is used for generating a standard clock for a real time counter, and the standard clock with a frequency drift of the low-power oscillator is compensated through table lookup. Accordingly, the power consumption, fabrication cost and design complexity of the RTC IC are reduced and the counting operation duration of the RTC IC is prolonged.

21 Claims, 5 Drawing Sheets

REAL TIME CLOCK INTEGRATED CIRCUIT AND ELECTRONIC APPARATUS USING THE SAME

CROSS-REFERENCE TO RELATED APPLICATION

This application claims the priority benefit of Taiwan application serial no. 96112238, filed on Apr. 9, 2007. All disclosure of the Taiwan application is incorporated herein by reference.

BACKGROUND OF THE INVENTION

1. Field of the Invention

The present invention generally relates to a real time clock integrated circuit (RTC IC) and an electronic apparatus using the same, in particular, to a RTC IC having low power consumption, low fabricating cost, and low design complexity and an electronic apparatus using the same.

2. Description of Related Art

Nowadays, electronic apparatuses have been broadly applied to various aspects of our lives, and a counting function is usually disposed in an electronic apparatus for the convenience of usage. For example, a real time clock integrated circuit (RTC IC) is required for the "schedule recording" function of a video recorder or the time switch of an audio system. In addition, today's personal computers, cell phones, MP3s, personal digital assistants (PDAs), or cameras are usually disposed with RTC ICs. When an electronic apparatus is powered off, the RTC IC disposed therein still keeps counting so that when the electronic apparatus is powered on again, the RTC IC can provide correct time instantly.

However, when foregoing electronic apparatus is powered off, the external power supply to the RTC IC is stopped so that the RTC IC stops its counting function and accordingly cannot provide a correct time to the electronic apparatus instantly. Thus, to allow the RTC IC to keep counting after the electronic apparatus is powered off, a button cell Lithium battery (for example, with supply voltage of 3.0V and capacity of 50 mAH) is usually provided. Besides, thanks to the advancement of semiconductor technology, only a very small driving current is required for today's RTC IC to operate properly; for example, a foregoing Lithium battery can sustain the operation of a RTC IC for over two years.

FIG. 1 is a block diagram illustrating the internal circuit of a conventional RTC IC 100. Referring to FIG. 1, generally speaking, a crystal oscillator 101 is used in the RTC IC 100 for providing a precise standard clock as the counting reference of a real time counter 103. However, some extra control logic circuits have to be disposed in the RTC IC 100 in order to provide the counting required by various circuits in the electronic apparatus, and these additional control logic circuits in the RTC IC 100 may cause increases in both the power consumption and fabrication cost of the RTC IC 100.

As described above, the increase in the power consumption of the RTC IC 100 will shorten the lifespan of foregoing button cell Lithium battery. In order to prolong the counting operation duration of the RTC IC 100, the power consumption thereof has to be reduced. Presently, a most common method is to divide the frequency of the standard clock provided by the crystal oscillator 101 with a frequency divider 102 so as to produce a standard clock with appropriate frequency. According to the method described above, both the power consumption and fabrication cost of the RTC IC 100 are reduced.

It should be mentioned here that not only the crystal oscillator 101 provides a precise standard clock, but the precision of the standard clock it provides is not affected by temperature, humidity, process, operation voltage etc, thus, the crystal oscillator 101 is usually applied to electronic apparatuses which require precise timing. However, because the crystal oscillator 101 consumes more driving current on the foregoing button cell Lithium battery, the duration of the RTC IC 100 performing counting operation is shortened. Besides, the fabrication cost of the crystal oscillator 101 is higher than that of other common oscillators (for example, ring oscillator, RC oscillator, relaxation oscillator, etc).

In order to reduce the power consumption of the RTC IC, a "Power Down System and Method for Integrated Circuit" is disclosed in U.S. Pat. No. 6,873,215, wherein both a crystal oscillator and a low-power oscillator are adopted. The crystal oscillator is turned on when the RTC IC is in an operation mode (namely, an external power is supplied to the RTC IC), and the low-power oscillator is turned on when the RTC IC is in a sleep mode (namely, there is no external power supplied to the RTC IC). Since the low-power oscillator consumes less driving current on the button cell Lithium battery, the duration of the RTC IC performing counting operation is prolonged.

However, the precision of the standard clock provided by the low-power oscillator is easily affected by environmental factors (for example, temperature, humidity, process, operation voltage etc). Thus, according to the technique disclosed in U.S. Pat. No. 6,873,215, a sensor is further disposed in the RTC IC for measuring the standard clock provided by the low-power oscillator, and when the standard clock provided by the low-power oscillator produces a frequency drift, the standard clock provided by the crystal oscillator is used for compensating the standard clock provided by the low-power oscillator. However, by directly measuring the standard clock provided by the low-power oscillator with the sensor, both the design complexity and the fabrication cost of the RTC IC are increased.

SUMMARY OF THE INVENTION

Accordingly, the present invention is directed to a real time clock integrated circuit (RTC IC) and an electronic apparatus with the RTC IC. According to the present invention, the RTC IC uses only a low-power oscillator for providing a standard clock to a real time counter, and the standard clock produced by the low-power oscillator is compensated through table lookup when a frequency drift is produced by the standard clock. Thus, not only the power consumption, the fabrication cost, and the design complexity of the RTC IC are reduced, but the duration of the RTC IC performing counting operation is prolonged.

The present invention provides a RTC IC including a low-power oscillator, a real time counter and a control unit. The low-power oscillator provides a standard clock which produces a frequency drift corresponding to the current operation voltage of the low-power oscillator. The real time counter counts a first counting number according to the standard clock without the frequency drift provided by the low-power oscillator so as to obtain a constant counting time, and the real time counter produces a detection signal timely.

The control unit is coupled to the low-power oscillator and the real time counter. The control unit detects the current operation voltage of the low-power oscillator when it receives the detection signal from the real time counter and locates the standard clock without the frequency drift of the low-power oscillator in a lookup table according to the current operation voltage of the low-power oscillator, and then the control unit determines whether or not a frequency drift is produced by the current standard clock of the low-power oscillator, wherein if a frequency drift is produced by the current standard clock of the low-power oscillator, the real time counter counts a second or a third counting number so as to obtain the constant counting time.

According to an embodiment of the present invention, the control unit includes a voltage detector, a lookup unit and a compensation unit. The voltage detector is coupled to the low-power oscillator and the real time counter and detects the current operation voltage of the low-power oscillator when it receives the detection signal from the real time counter. The lookup unit is coupled to the voltage detector and is built in with the lookup table. The lookup unit locates the standard clock without the frequency drift in the lookup table according to the current operation voltage of the low-power oscillator.

The compensation unit is coupled to the lookup unit, the low-power oscillator and the real time counter. The compensation unit determines whether or not a frequency drift is produced by the current standard clock of the low-power oscillator according to the standard clock without the frequency drift corresponding to the current operation voltage of the low-power oscillator. When the current standard clock of the low-power oscillator with the frequency drift is higher than the standard clock without the frequency drift, the real time counter counts the second counting number so as to obtain the constant counting time, and when the current standard clock of the low-power oscillator with the frequency drift is lower than the standard clock without the frequency drift, the real time counter counts the third counting number so as to obtain the constant counting time, wherein the second counting number is greater than the first counting number, and the third counting number is smaller than the first counting number.

The present invention further provides a RTC IC including an adjustable low-power oscillator, a real time counter and a control unit. The adjustable low-power oscillator provides a standard clock which produces a frequency drift corresponding to the current operation voltage of the adjustable low-power oscillator. The real time counter is coupled to the adjustable low-power oscillator. The real time counter counts a first counting number according to the standard clock without the frequency drift provided by the adjustable low-power oscillator so as to obtain a constant counting time, and the real time counter produces a detection signal timely.

The control unit is coupled to the adjustable low-power oscillator and the real time counter. The control unit detects the current operation voltage of the adjustable low-power oscillator when it receives the detection signal from the real time counter and locates the standard clock without the frequency drift corresponding to the current operation voltage of the adjustable low-power oscillator in a lookup table, and then the control unit determines whether or not a frequency drift is produced by the current standard clock of the adjustable low-power oscillator. If the frequency drift is produced by the current standard clock of the adjustable low-power oscillator, the control unit produces a first or second control signal correspondingly to make the current standard clock of the adjustable low-power oscillator become the standard clock without the frequency drift corresponding to the current operation voltage of the adjustable low-power oscillator, and the real time counter counts the first counting number so as to obtain the constant counting time accordingly.

According to an embodiment of the present invention, the control unit includes a voltage detector and a lookup unit. The voltage detector is coupled to the adjustable low-power oscillator and the real time counter and detects the current operation voltage of the adjustable low-power oscillator when it receives the detection signal from the real time counter. The lookup unit is coupled to the voltage detector and the adjustable low-power oscillator and is built in with the lookup table. The lookup unit locates the standard clock without the frequency drift in the lookup table according to the current operation voltage of the adjustable low-power oscillator and produces the first or second control signal correspondingly.

According to an embodiment of the present invention, the adjustable low-power oscillator includes a first switch, a first inverter, a second inverter and a third inverter. The first switch is coupled to the lookup unit and has a first terminal, a second terminal and a control terminal, wherein the control terminal of the first switch receives the first or second control signal and turns on or off the first switch accordingly. The first inverter has an input terminal and an output terminal, wherein the input terminal of the first inverter is coupled to the first terminal of the first switch. The second inverter has an input terminal and an output terminal, wherein the input terminal of the second inverter is coupled to the output terminal of the first inverter, and the output terminal of the second inverter is coupled to the second terminal of the first switch. The third inverter has an input terminal and an output terminal, wherein the input terminal of the third inverter is coupled to the output terminal of the second inverter, and the output terminal of the third inverter is coupled to the input terminal of the first inverter.

The present invention further provides an electronic apparatus including a RTC IC. The RTC IC includes a low-power oscillator, a real time counter and a control unit. The low-power oscillator provides a standard clock which produces a frequency drift corresponding to the current operation voltage, current operation temperature, or current operation humidity of the low-power oscillator. The real time counter counts a first counting number according to the standard clock without the frequency drift provided by the low-power oscillator so as to obtain a constant counting time, and the real time counter produces a detection signal timely.

The control unit is coupled to the low-power oscillator and the real time counter. The control unit detects the current operation voltage, current operation temperature, or current operation humidity of the low-power oscillator when it receives the detection signal from the real time counter and locates the standard clock without the frequency drift in a lookup table according to the current operation voltage, current operation temperature, or current operation humidity of the low-power oscillator, and then the control unit determines whether or not a frequency drift is produced by the current standard clock of the low-power oscillator. If a frequency drift is produced by the current standard clock of the low-power oscillator, the real time counter counts a second or third counting number so as to obtain the constant counting time.

According to an embodiment of the present invention, the electronic apparatus further includes a temperature detector and a humidity detector. The temperature detector is coupled to the low-power oscillator and the real time counter and detects the current operation temperature of the low-power oscillator when it receives the detection signal from the real time counter. The humidity detector is coupled to the low-power oscillator and the real time counter and detects the current operation humidity of the low-power oscillator when it receives the detection signal from the real time counter.

According to an embodiment of the present invention, the control unit includes a voltage detector and a lookup unit. The voltage detector is coupled to the low-power oscillator and the real time counter and detects the current operation voltage of the low-power oscillator when it receives the detection signal from the real time counter. The lookup unit is coupled to the voltage detector, the temperature detector and the humidity detector and is built in with the lookup table. The lookup unit locates the standard clock without the frequency drift in the lookup table according to the current operation voltage, current operation temperature, or current operation humidity of the low-power oscillator respectively detected by the voltage detector, temperature detector, or humidity detector.

The compensation unit is coupled to the lookup unit, the low-power oscillator and the real time counter. The compensation unit determines whether or not a frequency drift is produced by the current standard clock of the low-power oscillator according to the standard clock without the frequency drift corresponding to the current operation voltage, current operation temperature, or current operation humidity of the low-power oscillator. When the current standard clock of the low-power oscillator with the frequency drift is higher than the standard clock without the frequency drift, the real time counter counts the second counting number so as to obtain the constant counting time, and when the current standard clock of the low-power oscillator with the frequency drift is lower than the standard clock without the frequency drift, the real time counter counts the third counting number so as to obtain the constant counting time, wherein the second counting number is greater than the first counting number, and the third counting number is smaller than the first counting number.

The present invention further provides an electronic apparatus including a RTC IC. The RTC IC includes a low-power oscillator, a real time counter and a control unit. The low-power oscillator provides a standard clock which produces a frequency drift corresponding to the current operation voltage, current operation temperature, or current operation humidity of the low-power oscillator. The real time counter counts a first counting number according to the standard clock without the frequency drift provided by the low-power oscillator so as to obtain a constant counting time, and the real time counter produces a detection signal timely.

The control unit is coupled to the low-power oscillator and the real time counter. The control unit locates the standard clock without the frequency drift in a lookup table according to the current operation voltage, current operation temperature, or current operation humidity of the low-power oscillator and determines whether or not a frequency drift is produced by the current standard clock of the low-power oscillator. If a frequency drift is produced by the current standard clock of the low-power oscillator, the real time counter counts a second or third counting number so as to obtain the constant counting time.

According to an embodiment of the present invention, the electronic apparatus further includes a voltage detector, a temperature detector and a humidity detector. The voltage detector is coupled to the low-power oscillator and the real time counter and detects the current operation voltage of the low-power oscillator when it receives the detection signal from the real time counter. The temperature detector is coupled to the low-power oscillator and the real time counter and detects the current operation temperature of the low-power oscillator when it receives the detection signal from the real time counter. The humidity detector is coupled to the low-power oscillator and the real time counter and detects the current operation humidity of the low-power oscillator when it receives the detection signal from the real time counter.

According to an embodiment of the present invention, the control unit includes a lookup unit and a compensation unit. The lookup unit is coupled to the voltage detector, the temperature detector and the humidity detector and is built in with the lookup table. The lookup unit locates the standard clock without the frequency drift in the lookup table according to the current operation voltage, current operation temperature, or current operation humidity of the low-power oscillator respectively detected by the voltage detector, temperature detector, or humidity detector.

The compensation unit is coupled to the lookup unit, the low-power oscillator and the real time counter. The compensation unit determines whether or not a frequency drift is produced by the current standard clock of the low-power oscillator according to the standard clock without the frequency drift corresponding to the current operation voltage, current operation temperature, or current operation humidity of the low-power oscillator. When the current standard clock of the low-power oscillator with the frequency drift is higher than the standard clock without the frequency drift, the real time counter counts the second counting number so as to obtain the constant counting time, and when the current standard clock of the low-power oscillator with the frequency drift is lower than the standard clock without the frequency drift, the real time counter counts the third counting number so as to obtain the constant counting time, wherein the second counting number is greater than the first counting number, and the third counting number is smaller than the first counting number.

The present invention further provides another electronic apparatus including a RTC IC. The RTC IC includes an adjustable low-power oscillator, a real time counter and a control unit. The adjustable low-power oscillator provides a standard clock which produces a frequency drift corresponding to the current operation voltage, current operation temperature, or current operation humidity of the adjustable low-power oscillator. The real time counter is coupled to the adjustable low-power oscillator. The real time counter counts a first counting number according to the standard clock without the frequency drift provided by the adjustable low-power oscillator so as to obtain a constant counting time, and the real time counter produces a detection signal timely.

The control unit is coupled to the adjustable low-power oscillator and the real time counter. The control unit detects the current operation voltage, current operation temperature, or current operation humidity of the adjustable low-power oscillator when it receives the detection signal from the real time counter and locates the standard clock without the frequency drift in a lookup table according to the current operation voltage, current operation temperature, or current operation humidity of the adjustable low-power oscillator, and the control unit then determines whether or not a frequency drift is produced by the current standard clock of the adjustable low-power oscillator. When a frequency drift is produced by the current standard clock of the adjustable low-power oscillator, the control unit produces a first or second control signal correspondingly to make the current standard clock of the adjustable low-power oscillator become the standard clock without the frequency drift corresponding to the current operation voltage, current operation temperature, or current operation humidity of the adjustable low-power oscillator, and the real time counter counts the first counting number so as to obtain the constant counting time accordingly.

According to an embodiment of the present invention, the electronic apparatus further includes a temperature detector and a humidity detector. The temperature detector is coupled to the adjustable low-power oscillator and the real time counter and detects the current operation temperature of the adjustable low-power oscillator when it receives the detection signal from the real time counter. The humidity detector is coupled to the adjustable low-power oscillator and the real time counter and detects the current operation humidity of the adjustable low-power oscillator when it receives the detection signal from the real time counter.

According to an embodiment of the present invention, the control unit includes a voltage detector and a lookup unit. The voltage detector is coupled to the adjustable low-power oscillator and the real time counter and detects the current operation voltage of the adjustable low-power oscillator when it receives the detection signal from the real time counter. The lookup unit is coupled to the voltage detector, the temperature detector, the humidity detector and the adjustable low-power oscillator and is built in with the lookup table. The lookup unit locates the standard clock without the frequency drift in the lookup table according to the current operation voltage, current operation temperature, or current operation humidity of the adjustable low-power oscillator and produces the first or second control signal correspondingly.

According to an embodiment of the present invention, the adjustable low-power oscillator includes a first switch, a first inverter, a second inverter and a third inverter. The first switch is coupled to the lookup unit and has a first terminal, a second terminal and a control terminal, wherein the control terminal of the first switch receives the first or second control signal correspondingly and turns on or off the first switch accordingly. The first inverter has an input terminal and an output terminal, wherein the input terminal of the first inverter is coupled to the first terminal of the first switch. The second inverter has an input terminal and an output terminal, wherein the input terminal of the second inverter is coupled to the output terminal of the first inverter, and the output terminal of the second inverter is coupled to the second terminal of the first switch. The third inverter has an input terminal and an output terminal, wherein the input terminal of the third inverter is coupled to the output terminal of the second inverter, and the output terminal of the third inverter is coupled to the input terminal of the first inverter.

The present invention further provides another electronic apparatus including a RTC IC. The RTC IC includes an adjustable low-power oscillator, a real time counter and a control unit. The adjustable low-power oscillator provides a standard clock which produces a frequency drift corresponding to the current operation voltage, current operation temperature, or current operation humidity of the adjustable low-power oscillator. The real time counter is coupled to the adjustable low-power oscillator. The real time counter counts a first counting number according to the standard clock without the frequency drift provided by the adjustable low-power oscillator so as to obtain a constant counting time, and the real time counter produces a detection signal timely.

The control unit is coupled to the adjustable low-power oscillator and the real time counter. The control unit locates the standard clock without the frequency drift in a lookup table according to the current operation voltage, current operation temperature, or current operation humidity of the adjustable low-power oscillator and determines whether or not a frequency drift is produced by the current standard clock of the adjustable low-power oscillator. If a frequency drift is produced by the current standard clock of the adjustable low-power oscillator, the control unit produces a first or second control signal correspondingly to make the current standard clock of the adjustable low-power oscillator become the standard clock without the frequency drift corresponding to the current operation voltage, current operation temperature, or current operation humidity of the adjustable low-power oscillator, and the real time counter counts the first counting number so as to obtain the constant counting time accordingly.

According to an embodiment of the present invention, the electronic apparatus further includes a voltage detector, a temperature detector and a humidity detector. The voltage detector is coupled to the adjustable low-power oscillator and the real time counter and detects the current operation voltage of the adjustable low-power oscillator when it receives the detection signal from the real time counter. The temperature detector is coupled to the adjustable low-power oscillator and the real time counter and detects the current operation temperature of the adjustable low-power oscillator when it receives the detection signal from the real time counter. The humidity detector is coupled to the adjustable low-power oscillator and the real time counter and detects the current operation humidity of the adjustable low-power oscillator when it receives the detection signal from the real time counter.

According to an embodiment of the present invention, the control unit includes a lookup unit which is coupled to the voltage detector, the temperature detector, the humidity detector and the adjustable low-power oscillator and is built in with the lookup table. The lookup unit locates the standard clock without the frequency drift in the lookup table according to the current operation voltage, current operation temperature, or current operation humidity of the adjustable low-power oscillator and produces the first or second control signal correspondingly.

According to an embodiment of the present invention, the adjustable low-power oscillator includes a first switch, a first inverter, a second inverter and a third inverter. The first switch is coupled to the lookup unit and has a first terminal, a second terminal and a control terminal, wherein the control terminal of the first switch correspondingly receives the first or second control signal and turns on or off the first switch accordingly. The first inverter has an input terminal and an output terminal, wherein the input terminal of the first inverter is coupled to the first terminal of the first switch. The second inverter has an input terminal and an output terminal, wherein the input terminal of the second inverter is coupled to the output terminal of the first inverter, and the output terminal of the second inverter is coupled to the second terminal of the first switch. The third inverter has an input terminal and an output terminal, wherein the input terminal of the third inverter is coupled to the output terminal of the second inverter, and the output terminal of the third inverter is coupled to the input terminal of the first inverter.

According to an embodiment of the present invention, the RTC IC further includes an interface bus coupled to the lookup unit, the compensation unit and the real time counter. The interface bus synchronously or asynchronously sets to the lookup unit, the compensation unit, and the real time counter by an electronic apparatus system with a microprocessor according to a standard serial transmission protocol.

According to an embodiment of the present invention, the adjustable low-power oscillator further includes a second switch, a fourth inverter and a fifth inverter. The second switch is coupled to the lookup unit and has a first terminal, a second terminal and a control terminal, wherein the control terminal of the second switch correspondingly receives the first or second control signal and turns on or off the second switch accordingly, the first terminal of the second switch is coupled to the output terminal of the third inverter, and the second terminal of the second switch is coupled to the first terminal of the first switch. The fourth inverter has an input terminal and an output terminal, wherein the input terminal of the fourth inverter is coupled to the first terminal of the second switch. The fifth inverter has an input terminal and an output terminal, wherein the input terminal of the fifth inverter is coupled to the output terminal of the fourth inverter, and the output terminal of the fifth inverter is coupled to the input terminal of the first inverter.

According to an embodiment of the present invention, the lookup table stores a characteristic curve of the standard clock without the frequency drift corresponding to the current operation voltage of the low-power oscillator under a normal or abnormal temperature.

According to an embodiment of the present invention, the lookup table stores a characteristic curve of the standard clock without the frequency drift corresponding to the current operation voltage of the adjustable low-power oscillator under a normal or abnormal temperature.

According to an embodiment of the present invention, the lookup table stores a plurality of characteristic curves of the standard clock without the frequency drift corresponding to the current operation voltage, current operation temperature, and current operation humidy of the low-power oscillator under a normal or abnormal temperature.

According to an embodiment of the present invention, the lookup table stores a plurality of characteristic curves of the standard clock without the frequency drift corresponding to the current operation voltage, current operation temperature, and current operation humidy of the adjustable low-power oscillator under a normal or abnormal temperature.

According to the present invention, a RTC IC is provided to today's electronic apparatuses which require precise counting, wherein a plurality of characteristic curves of a standard clock without frequency drift corresponding to the current operation voltage, current operation temperature, and current operation humidity of a low-power oscillator under a normal or abnormal temperature is stored in a lookup table, and a voltage detector, a temperature detector, and a humidity detector are adopted for respectively detecting the current operation voltage, current operation temperature, and current operation humidity of the low-power oscillator, and then the standard clock with frequency drift of the low-power oscillator is compensated through table lookup. Accordingly, the power consumption, fabrication cost, and design complexity of the RTC IC in the present invention are reduced, and the duration of the counting operation thereof is prolonged.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
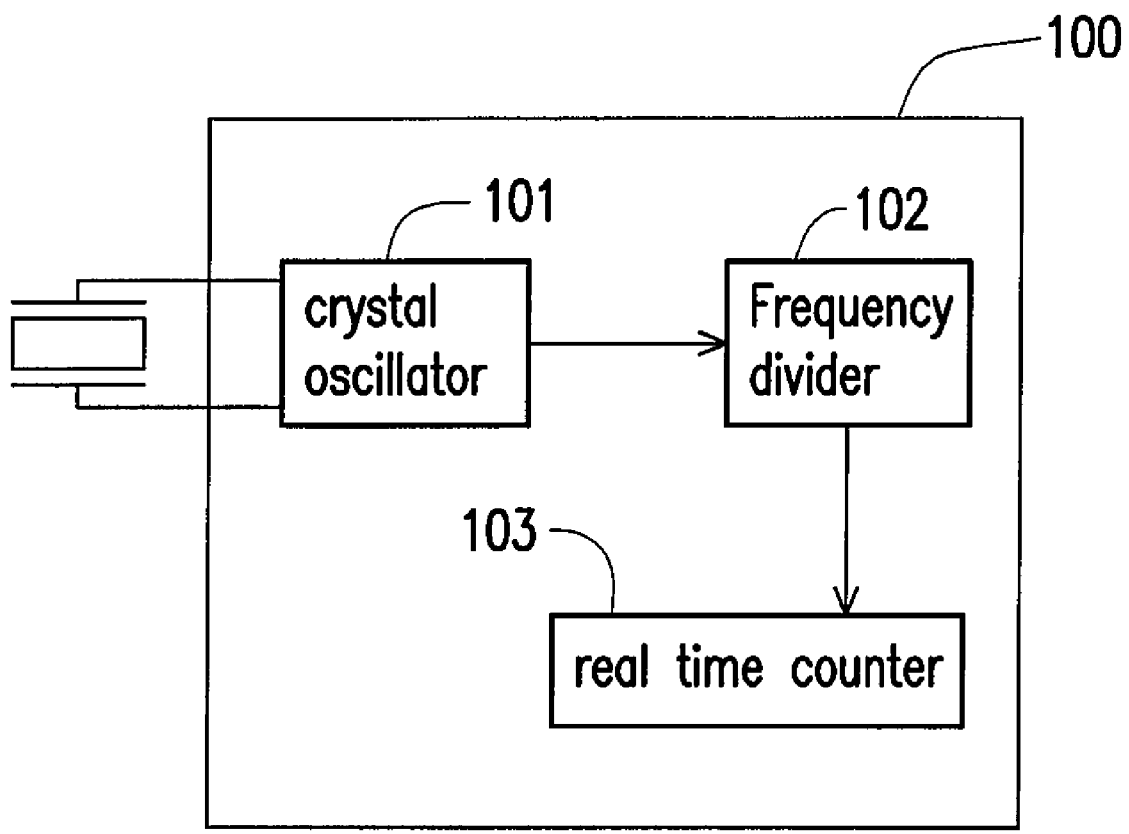
FIG. 1 is a block diagram illustrating the internal circuit of a conventional real time clock integrated circuit (RTC IC).

Reference will now be made in detail to the present preferred embodiments of the invention, examples of which are illustrated in the accompanying drawings. Wherever possible, the same reference numbers are used in the drawings and the description to refer to the same or like parts.

The present invention is directed to reducing the power consumption, fabrication cost, and design complexity of a real time clock integrated circuit (RTC IC) and prolonging the counting operation duration of the RTC IC. The features, aspects, and advantages of the present invention will be described and become more apparent from the following detailed descriptions of exemplary embodiments with reference to accompanying drawings.

Figure 2:
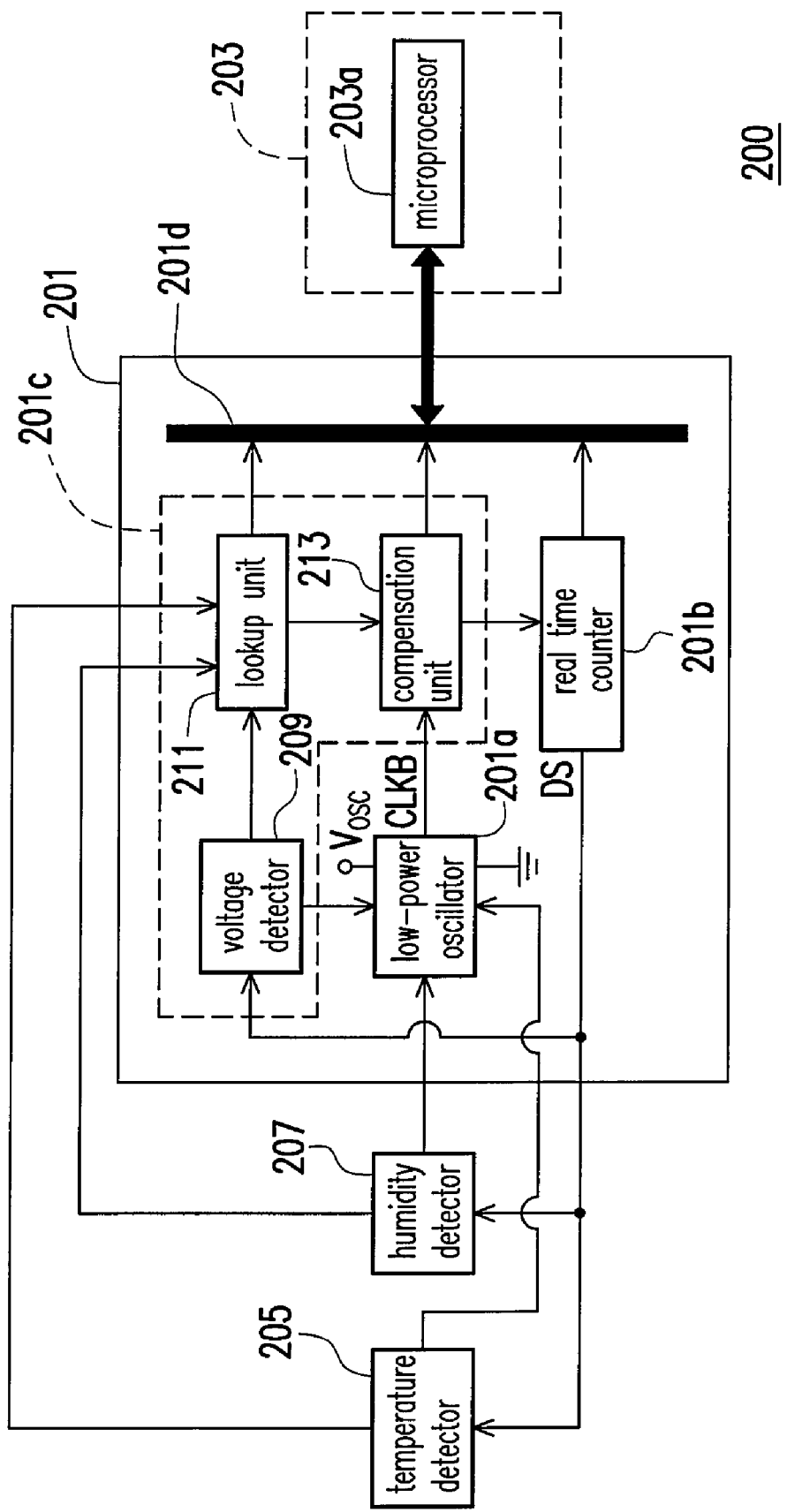
FIG. 2 is a block diagram of an electronic apparatus according to an embodiment of the present invention.

FIG. 2 is a block diagram of an electronic apparatus 200 according to an embodiment of the present invention. Referring to FIG. 2, in the present embodiment, the electronic apparatus 200 may be a video recorder, an audio system, a personal computer, a cell phone, a MP3, a personal digital assistant (PDA), a camera etc but is not limited thereto. The electronic apparatus 200 includes a RTC IC 201, an electronic apparatus system 203, a temperature detector 205, and a humidity detector 207. The RTC IC 201 provides a precise counting to the electronic apparatus 200 when the electronic apparatus 200 is powered on/off.

In the present embodiment, the RTC IC 201 includes a low-power oscillator 201a, a real time counter 201b, a control unit 201c, and an interface bus 201d. The low-power oscillator 201a may be one of a ring oscillator, a RC oscillator, a relaxation oscillator etc, but is not limited thereto. The low-power oscillator 201a provides a standard clock CLKB, and the standard clock CLKB produces a frequency drift corresponding to the current operation voltage Vosc of the low-power oscillator 201a.

The real time counter 201b counts a first counting number according to the standard clock CLKB without the frequency drift provided by the low-power oscillator 201a so as to obtain a constant counting time, and the real time counter 201b produces a detection signal DS timely (for example, every 30 seconds but not limited thereto). For example, assuming the first counting number is 1000, the real time counter 201b counts the standard clock CLKB without the frequency drift provided by the low-power oscillator 201a for 1000 times and may obtain a constant counting time of 1 second.

The control unit 201c is coupled to the low-power oscillator 201a and the real time counter 201b. The control unit 201c detects the current operation voltage Vosc of the low-power oscillator 201a when it receives the detection signal DS from the real time counter 201b, and accordingly locates the standard clock CLKB without the frequency drift according to the current operation voltage Vosc of the low-power oscillator 201a, and then determines whether or not a frequency drift is produced by the current standard clock CLKB of the low-power oscillator 201a, wherein if the frequency drift is produced by the current standard clock CLKB of the low-power oscillator 201a, the real time counter 201b counts a second or third counting number so as to obtain the constant counting time.

In the present embodiment, the control unit 201c includes a voltage detector 209, a lookup unit 211, and a compensation unit 213. The voltage detector 209 is coupled to the low-power oscillator 201a and the real time counter 201b. The voltage detector 209 detects the current operation voltage Vosc of the low-power oscillator 201a when it receives the detection signal DS from the real time counter 201b. The lookup unit 211 is coupled to the voltage detector 209 and is built in with the lookup table. The lookup unit 211 locates the standard clock CLKB without the frequency drift in the lookup table according to the current operation voltage Vosc of the low-power oscillator 201a.

The compensation unit 213 is coupled to the lookup unit 211, the low-power oscillator 201a, and the real time counter 201b. The compensation unit 213 determines whether or not a frequency drift is produced by the current standard clock CLKB of the low-power oscillator 201a according to the standard clock CLKB without the frequency drift corresponding to the current operation voltage Vosc of the low-power oscillator 201a. When the current standard clock CLKB with frequency drift of the low-power oscillator 201a is higher than the standard clock CLKB without the frequency drift, the real time counter 201b counts the second counting number so as to obtain the constant counting time, and when the current standard clock CLKB with frequency drift of the low-power oscillator 201a is lower than the standard clock CLKB without the frequency drift, the real time counter 201b counts the third counting number so as to obtain the constant counting time, wherein the second counting number is greater than the first counting number, and the third counting number is smaller than the first counting number.

The interface bus 201d is coupled to the lookup unit 211, the compensation unit 213, and the real time counter 201b. The interface bus 201d synchronously or asynchronously sets to the lookup unit 211, the compensation unit 213, and the real time counter 201b by the electronic apparatus system 203 with a microprocessor 203a according to a standard serial transmission protocol. The interface bus 201d may be an inner integrated circuit (I²C) bus, a serial peripheral interface (SPI) bus, a microwire interface bus, or a controller area network (CAN) bus etc, but is not limited thereto.

The temperature detector 205 is coupled to the low-power oscillator 201a and the real time counter 201b. The temperature detector 205 detects the current operation temperature of the low-power oscillator 201a when it receives the detection signal DS from the real time counter 201b. The humidity detector 207 is coupled to the low-power oscillator 201a and the real time counter 201b. The humidity detector 207 detects the current operation humidity of the low-power oscillator 201a when it receives the detection signal DS from the real time counter 201b.

Figure 3:
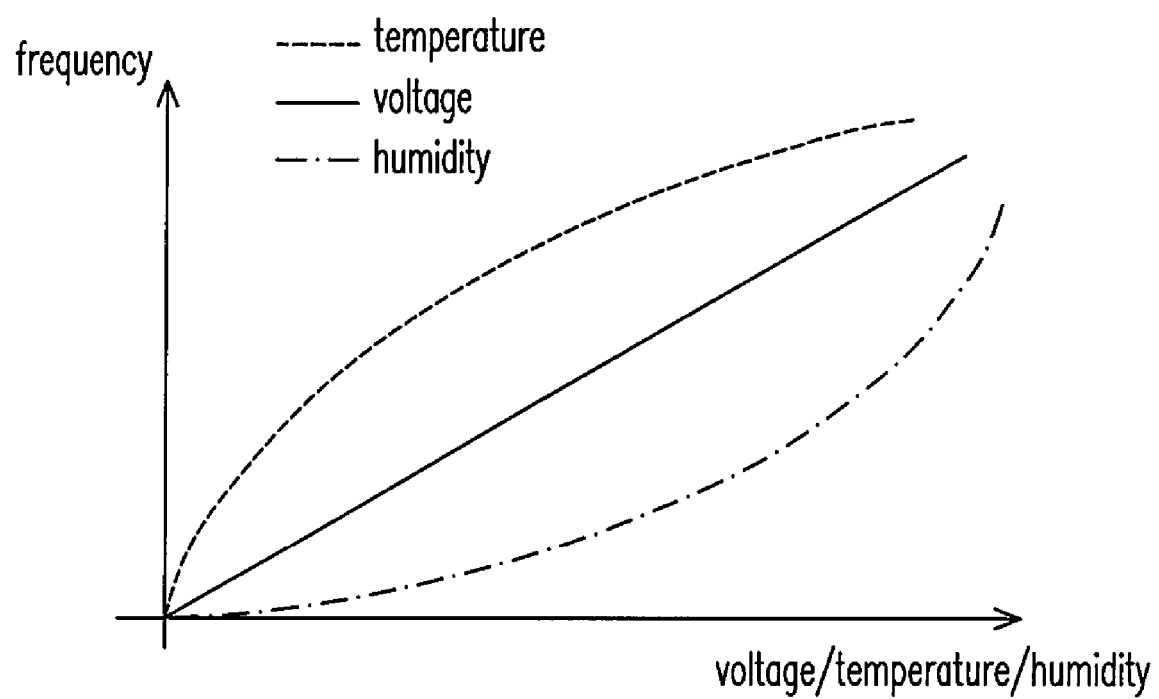
FIG. 3 is a diagram of a lookup table built in a lookup unit.

FIG. 3 is a diagram of a lookup table built in the lookup unit 211. Referring to both FIG. 2 and FIG. 3, the built-in lookup table of the lookup unit 211 records a plurality of characteristic curves of the standard clock CLKB without the frequency drift corresponding to the current operation voltage Vosc, the current operation temperature, and the current operation humidity of the low-power oscillator 201a under a normal or abnormal temperature. Below, the operation flow in the RTC IC 201 when the voltage detector 209 receives the detection signal DS from the real time counter 201b will be described as an example.

In the present embodiment, the voltage detector 209 detects the current operation voltage Vosc of the low-power oscillator 201a when it receives the detection signal DS from the real time counter 201b, and then the lookup unit 211 locates the standard clock CLKB without the frequency drift corresponding to the current operation voltage Vosc of the low-power oscillator 201a in the built-in lookup table.

It should be mentioned here that the precision of the standard clock CLKB of the low-power oscillator 201a is easily affected by the variation of the operation voltage Vosc thereof, thus, when the current standard clock CLKB of the low-power oscillator 201a is higher than the standard clock CLKB without the frequency drift, the constant counting time obtained by the real time counter 201b will be less than 1 second if the real time counter 201b counts the first counting number (i.e. 1000) according to the higher standard clock CLKB.

Accordingly, here the compensation unit 213 determines whether or not the frequency drift is produced by the current standard clock CLKB of the low-power oscillator 201a according to the standard clock CLKB without the frequency drift corresponding to the current operation voltage Vosc of the low-power oscillator 201a located in the lookup table by the lookup unit 211. When the current standard clock CLKB with the frequency drift of the low-power oscillator 201a is higher than the standard clock CLKB without the frequency drift, the real time counter 201b counts the second counting number so as to obtain the constant counting time. Accordingly, the second counting number must be greater than the first counting number, for example, the second counting number may be 1100. Thus, the real time counter 201b obtains a constant counting time of 1 second if it counts the second counting number (i.e. 1100) according to the higher standard clock CLKB.

In addition, when the current standard clock CLKB with the frequency drift of the low-power oscillator 201a is lower than the standard clock CLKB without the frequency drift, the constant counting time obtained by the real time counter 201b will be longer than 1 second if the real time counter 201b counts the first counting number (i.e. 1000) according to the lower standard clock CLKB.

Accordingly, here the compensation unit 213 determines whether the frequency drift is produced by the current standard clock CLKB of the low-power oscillator 201a according to the standard clock CLKB without the frequency drift corresponding to the current operation voltage Vosc of the low-power oscillator 201a located in the lookup table by the lookup unit 211. When the current standard clock CLKB with the frequency drift of the low-power oscillator 201a is lower than the standard clock CLKB without the frequency drift, the real time counter 201b counts the third counting number and obtains the constant counting time. Accordingly, the third counting number must be smaller than the first counting number, for example, the third counting number may be 900. Thus, the real time counter 201b obtains a constant counting time of 1 second if it counts the third counting number (i.e. 900) according to the lower standard clock CLKB.

Besides, when the temperature detector 205 or the humidity detector 207 receives the detection signal DS from the real time counter 201b, the operation flow in the RTC IC 201 is similar to that when the voltage detector 209 receives the detection signal DS from the real time counter 201b, therefore will not be described herein.

In the present embodiment, the voltage detector 209 only detects the current operation voltage Vosc of the low-power oscillator 201a after it receives the detection signal DS from the real time counter 201b, thus, the average power consumption of the voltage detector 209 during a prolonged period can be nearly ignored. In another embodiment of the present invention, the voltage detector 209 may not be embedded in the RTC IC 201, namely, the voltage detector 209 may also be disposed outside of the RTC IC 201 as the temperature detector 205 and the humidity detector 207, so that the design complexity and fabrication cost of the RTC IC 201 can be further reduced.

It should be mentioned here that the lookup unit 211 in foregoing embodiment may be programmable so that the parameters of a plurality of characteristic curves of the standard clock CLKB without the frequency drift corresponding to the current operation voltage Vosc, the current operation temperature, and the current operation humidity of the low-power oscillator 201a in the lookup table can be updated along with the changes of environmental factors of RTC IC 201.

Figure 4:
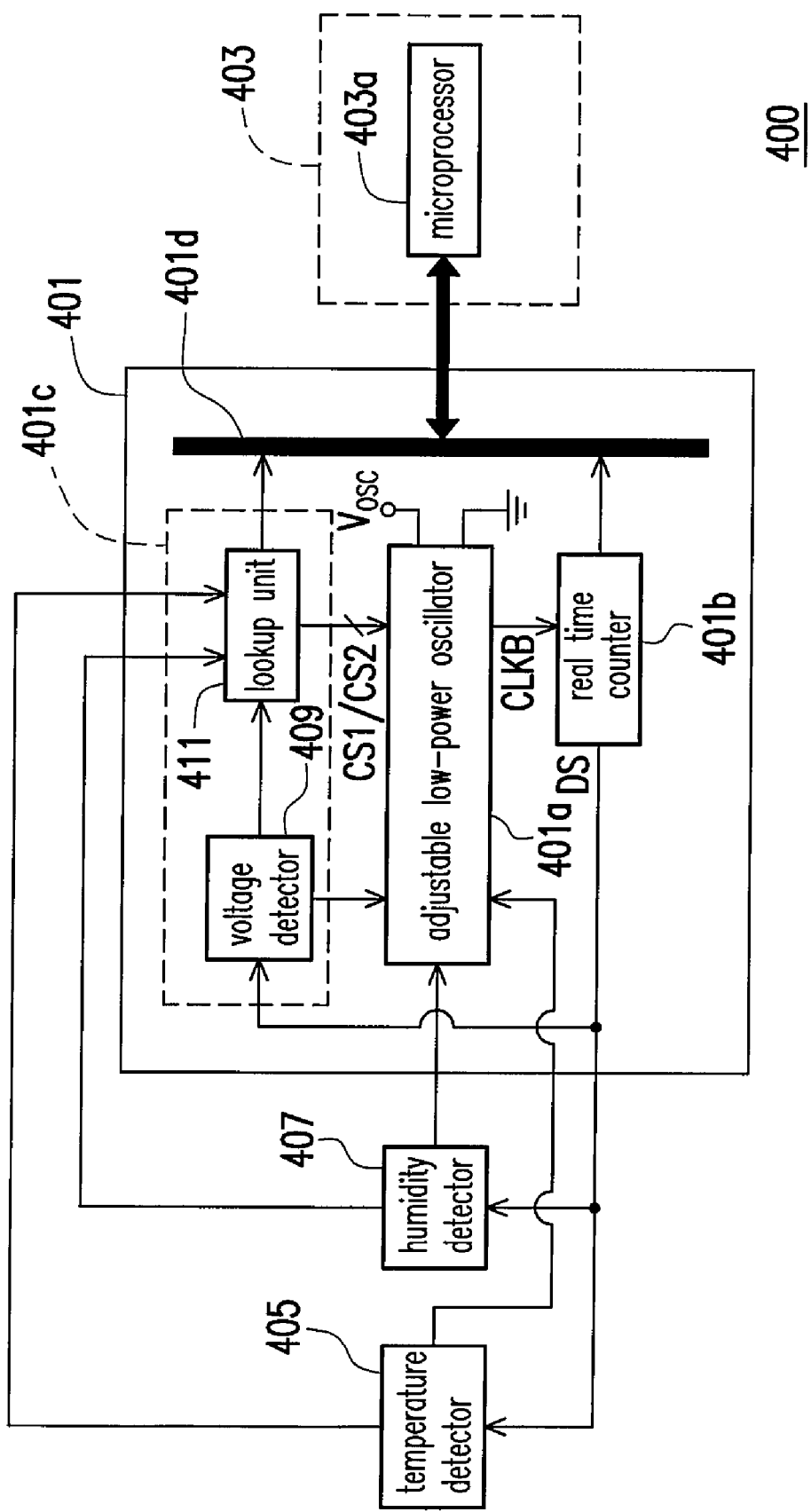
FIG. 4 is a block diagram of an electronic apparatus according to another embodiment of the present invention.

FIG. 4 is a block diagram of an electronic apparatus 400 according to another embodiment of the present invention. Referring to FIG. 4, in the present embodiment, the electronic apparatus 400 may be a video recorder, an audio system, a personal computer, a cell phone, a MP3, a PDA, a camera etc but is not limited thereto. The electronic apparatus 400 includes a RTC IC 401, an electronic apparatus system 403, a temperature detector 405, and a humidity detector 407. The RTC IC 401 provides a precise counting time to the electronic apparatus 400 when the electronic apparatus 400 is powered on/off.

In the present embodiment, the RTC IC 401 includes an adjustable low-power oscillator 401*a*, a real time counter 401*b*, a control unit 401*c*, and an interface bus 401*d*. The adjustable low-power oscillator 401*a* may be one of a ring oscillator, a RC oscillator, a relaxation oscillator etc, but is not limited thereto. The adjustable low-power oscillator 401*a* provides a standard clock CLKB, and the standard clock CLKB produces a frequency drift corresponding to the current operation voltage Vosc of the adjustable low-power oscillator 401*a*.

The real time counter 401*b* counts a first counting number according to the standard clock CLKB without the frequency drift of the adjustable low-power oscillator 401*a* so as to obtain a constant counting time, and the real time counter 401*b* produces a detection signal DS timely (for example, every 30 seconds but not limited thereto). For example, assuming the first counting number is 1000, the real time counter 401*b* may obtain a constant counting time of 1 second after it counts the standard clock CLKB without the frequency drift of the adjustable low-power oscillator 401*a* for 1000 times.

The control unit 401*c* is coupled to the adjustable low-power oscillator 401*a* and the real time counter 401*b*. The control unit 401*c* detects the current operation voltage Vosc of the adjustable low-power oscillator 401*a* when it receives the detection signal DS from the real time counter 401*b* and accordingly locates the standard clock CLKB without the frequency drift corresponding to the current operation voltage Vosc of the adjustable low-power oscillator 401*a* in a lookup table. The control unit 401*c* then determines whether the frequency drift is produced by the current standard clock CLKB of the adjustable low-power oscillator 401*a*, wherein if the frequency drift is produced by the current standard clock CLKB of the adjustable low-power oscillator 401*a*, the control unit 401*c* correspondingly produces a first control signal CS1 or a second control signal CS2 to make the current standard clock CLKB of the adjustable low-power oscillator 401*a* become the standard clock CLKB without the frequency drift corresponding to the current operation voltage Vosc of the adjustable low-power oscillator 401*a*, and the real time counter 401*b* counts the first counting number so as to obtain the constant counting time accordingly.

In the present embodiment, the control unit 401*c* includes a voltage detector 409 and a lookup unit 411. The voltage detector 409 is coupled to the adjustable low-power oscillator 401*a* and the real time counter 401*b*. The voltage detector 409 detects the current operation voltage Vosc of the adjustable low-power oscillator 401*a* when it receives the detection signal DS from the real time counter 401*b*. The lookup unit 411 is coupled to the voltage detector 409 and the adjustable low-power oscillator 401*a* and is built in with the lookup table. The lookup unit 411 locates the standard clock CLKB without the frequency drift corresponding to the current operation voltage Vosc of the adjustable low-power oscillator 401*a* in the built-in lookup table and produces the first control signal CS1 or the second control signal CS2 correspondingly.

The interface bus 401*d* is coupled to the lookup unit 411 and the real time counter 401*b*. The interface bus 401*d* synchronously or asynchronously sets to the lookup unit 411 and the real time counter 401*b* by the electronic apparatus system 403 with a microprocessor 403*a* according to a standard serial transmission protocol. The interface bus 401*d* may be an I²C bus, a SPI bus, a microwire interface bus, or a CAN bus etc, but is not limited thereto.

The temperature detector 405 is coupled to the adjustable low-power oscillator 401*a* and the real time counter 401*b*. The temperature detector 405 detects the current operation temperature of the adjustable low-power oscillator 401*a* when it receives the detection signal DS from the real time counter 401*b*. The humidity detector 407 is coupled to the adjustable low-power oscillator 401*a* and the real time counter 401*b*. The humidity detector 407 detects the current operation humidity of the adjustable low-power oscillator 401*a* when it receives the detection signal DS from the real time counter 401*b*.

In the present embodiment, the built-in lookup table of the lookup unit 411 records a plurality of characteristic curves of the standard clock CLKB without the frequency drift corresponding to the current operation voltage Vosc, the current operation temperature, and the current operation humidity of the adjustable low-power oscillator 401*a* under a normal or abnormal temperature as illustrated in FIG. 3. Similarly, the lookup unit 411 may be programmable so that the parameters of a plurality of characteristic curves of the standard clock CLKB without the frequency drift corresponding to the current operation voltage Vosc, the current operation temperature, and the current operation humidity of the low-power oscillator 401*a* in the lookup table can be updated along with the changes of environmental factors of RTC IC 401.

Figure 5:
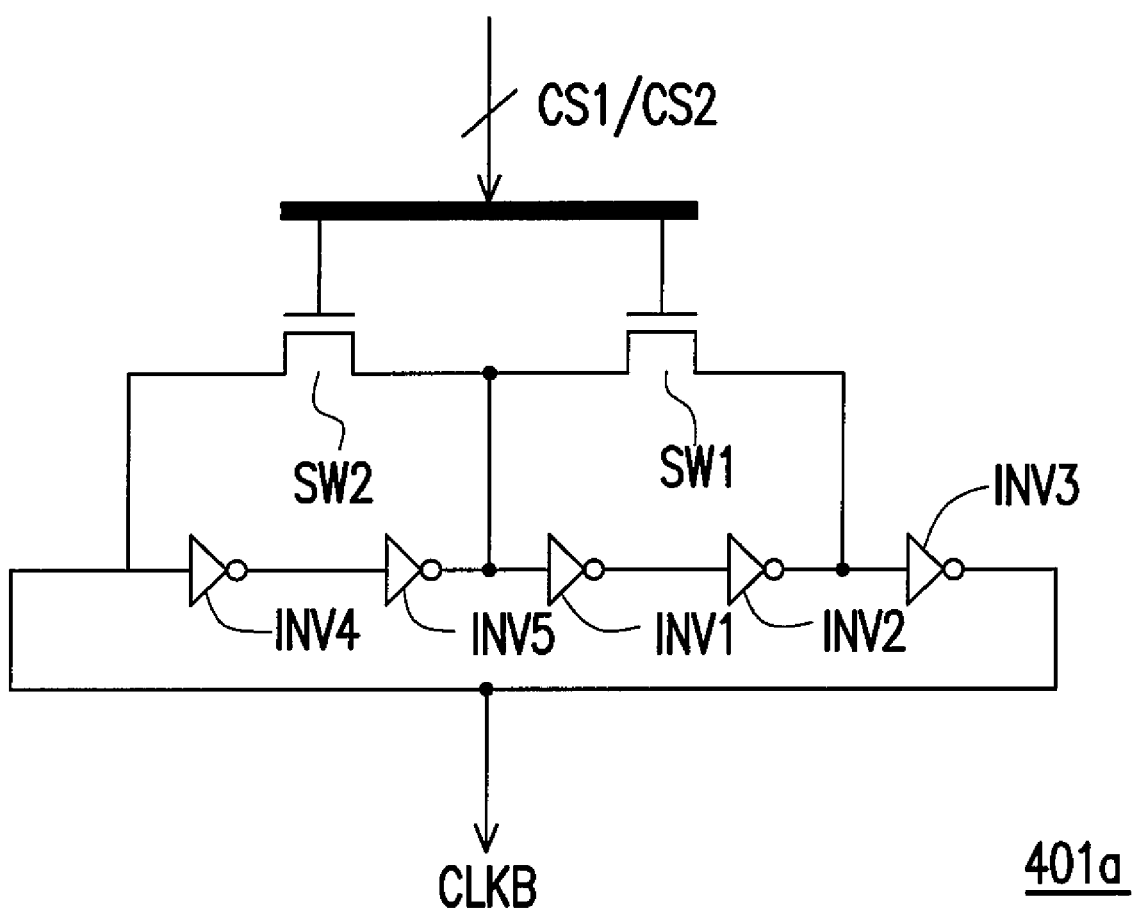
FIG. 5 is a circuit diagram illustrating the internal circuit of an adjustable low-power oscillator according to an embodiment of the present invention.

FIG. 5 is a circuit diagram illustrating the internal circuit of the adjustable low-power oscillator 401*a* in the present embodiment. Referring to FIG. 5, the adjustable low-power oscillator 401*a* includes a first switch SW1, a second switch SW2, a first inverter INV1, a second inverter INV2, a third inverter INV3, a fourth inverter INV4, and a fifth inverter INV5. The first switch SW1 and the second switch SW2 are coupled to the lookup unit 411. The control terminals of the first switch SW1 and the second switch SW2 correspondingly receive the first control signal CS1 or the second control signal CS2, and the first switch SW1 and the second switch SW2 are turned on or off according to the received first control signal CS1 or second control signal CS2.

The first terminal of the first switch SW1 is coupled to the second terminal of the second switch SW2, the input terminal of the first inverter INV1, and the output terminal of the fifth inverter INV5, the second terminal of the first switch SW1 is coupled to the output terminal of the second inverter INV2 and the input terminal of the third inverter INV3, and the first terminal of the second switch SW2 is coupled to the input terminal of the fourth inverter INV4 and the output terminal of the third inverter INV3 for outputting the standard clock CLKB. The output terminal of the first inverter INV1 is coupled to the input terminal of the second inverter INV2, and the output terminal of the fourth inverter INV4 is coupled to the input terminal of the fifth inverter INV5.

In the present embodiment, the number of inverters INV1~INV5 connected in series in the adjustable low-power oscillator 401*a* may be increased in order to reduce the frequency of the standard clock CLKB of the adjustable low-power oscillator 401*a*; and the number of inverters INV1~INV5 connected in series in the adjustable low-power oscillator 401*a* may be reduced in order to increase the frequency of the standard clock CLKB of the adjustable low-power oscillator 401a. In addition, To further reduce the frequency of the standard clock CLKB of the adjustable low-power oscillator 401a, the number of switches (not shown) and the number of inverters connected in series between two terminals of the switches may be increased in the adjustable low-power oscillator 401a, or the number of inverters connected in series between the first and the second terminal of the first switch SW1 and the first and the second terminal of the second switch SW2 may be increased.

The operation flow in the RTC IC 401 when the voltage detector 409 receives the detection signal DS from the real time counter 401b will be described below as an example.

As described above, the voltage detector 409 detects the current operation voltage Vosc of the adjustable low-power oscillator 401a when it receives the detection signal DS from the real time counter 401b. Here the lookup unit 411 locates the standard clock CLKB without the frequency drift corresponding to the current operation voltage Vosc of the adjustable low-power oscillator 401a in the built-in lookup table.

It should be mentioned here that the precision of the standard clock CLKB of the adjustable low-power oscillator 401a is easily affected by the changes of the operation voltage Vosc thereof, thus, when the current standard clock CLKB with the frequency drift of the adjustable low-power oscillator 401a is higher or lower than the standard clock CLKB without the frequency drift, the constant counting time obtained by the real time counter 401b will be smaller than or greater than 1 second if the real time counter 401b counts the first counting number (i.e. 1000) according to the higher or the lower standard clock CLKB.

Accordingly, the lookup unit 411 locates the standard clock CLKB without the frequency drift corresponding to the current operation voltage Vosc of the adjustable low-power oscillator 401a in the built-in lookup table, and correspondingly, the lookup unit 411 produces the first control signal CS1 or the second control signal CS2 and sends it to the control terminals of the first switch SW1 and the second switch SW2, so that the number of inverters INV1~INV5 connected in series in the adjustable low-power oscillator 401a is changed, and further the current standard clock CLKB of the adjustable low-power oscillator 401a becomes the standard clock CLKB without the frequency drift corresponding to the current operation voltage Vosc of the adjustable low-power oscillator 401a, and accordingly the real time counter 401b counts the first counting number so as to obtain the constant counting time.

In addition, when the temperature detector 405 or the humidity detector 407 receives the detection signal DS from the real time counter 401b, the operation flow in the RTC IC 401 is similar to that when the voltage detector 409 receives the detection signal DS from the real time counter 401b, therefore will not be described herein.

In the present embodiment, the voltage detector 409 only detects the current operation voltage Vosc of the adjustable low-power oscillator 401a after it receives the detection signal DS from the real time counter 401b, thus, the average power consumption of the voltage detector 409 during a prolonged period can be nearly ignored. In another embodiment of the present invention, the voltage detector 409 may not be embedded in the RTC IC 401, namely, the voltage detector 409 may also be disposed outside of the RTC IC 401 as the temperature detector 405 and the humidity detector 407, so that the design complexity and fabrication cost of the RTC IC 401 can be further reduced.

In summary, a RTC IC and an electronic apparatus with the RTC IC are provided by the present invention. According to the present invention, a plurality of characteristic curves of a standard clock without frequency drift of a low-power oscillator corresponding to a current operation voltage, current operation temperature, and current operation humidity of the low-power oscillator under a normal or abnormal temperature is stored in a lookup table, and a voltage detector, a temperature detector, and a humidity detector are adopted for detecting the current operation voltage, current operation temperature, and current operation humidity of the low-power oscillator, and the standard clock with frequency drift of the low-power oscillator is compensated through table lookup. Thus, the power consumption, fabrication cost, and design complexity of the RTC IC in the present invention are reduced and the duration of the counting operation of the RTC IC is prolonged.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A RTC IC, comprising:
an adjustable low-power oscillator, for providing a standard clock, wherein the standard clock produces a frequency drift corresponding to a current operation voltage of the adjustable low-power oscillator;
a real time counter, coupled to the adjustable low-power oscillator, for counting a first counting number according to the standard clock without the frequency drift so as to obtain a constant counting time, and producing a detection signal timely; and
a control unit, coupled to the adjustable low-power oscillator and the real time counter, for detecting the current operation voltage of the adjustable low-power oscillator when the control unit receives the detection signal, and locating the standard clock without the frequency drift corresponding to the current operation voltage of the adjustable low-power oscillator in a lookup table to determine whether or not the frequency drift is produced by a current standard clock of the adjustable low-power oscillator, wherein if the frequency drift is produced by the current standard clock of the adjustable low-power oscillator, the control unit produces a first control signal or a second control signal correspondingly to make the current standard clock of the adjustable low-power oscillator become the standard clock without the frequency drift corresponding to the current operation voltage of the adjustable low-power oscillator, and the real time counter counts the first counting number so as to obtain the constant counting time accordingly,
wherein the adjustable low-power oscillator comprises:
a first switch, coupled to the lookup unit, having a first terminal, a second terminal and a control terminal, wherein the control terminal of the first switch receives the first control signal or the second control signal correspondingly and turns on or off the first switch accordingly;
a first inverter, having an input terminal and an output terminal, wherein the input terminal of the first inverter is coupled to the first terminal of the first switch;
a second inverter, having an input terminal and an output terminal, wherein the input terminal of the second inverter is coupled to the output terminal of the first inverter, and the output terminal of the second inverter is coupled to the second terminal of the first switch; and a third inverter, having an input terminal and an output terminal, wherein the input terminal of the third inverter is coupled to the output terminal of the second inverter, and the output terminal of the third inverter is coupled to the input terminal of the first inverter.

2. The RTC IC according to claim 1, wherein the control unit comprises:

a voltage detector, coupled to the adjustable low-power oscillator and the real time counter, for detecting the current operation voltage of the adjustable low-power oscillator when the voltage detector receives the detection signal; and a lookup unit with the lookup table, coupled to the voltage detector and the adjustable low-power oscillator, for locating the standard clock without the frequency drift corresponding to the current operation voltage of the adjustable low-power oscillator in the lookup table, and producing the first control signal or the second control signal correspondingly.

3. The RTC IC according to claim 2, further comprising an interface bus, coupled to the lookup unit and the real time counter, for synchronously or asynchronously setting to the lookup unit and the real time counter by an electronic apparatus system with a microprocessor according to a standard serial transmission protocol.

4. The RTC IC according to claim 3, wherein the interface bus comprises an I²C bus, a SPI bus, a microwire interface bus, or a CAN bus.

5. The RTC IC according to claim 1, wherein the adjustable low-power oscillator further comprises:

a second switch, coupled to the lookup unit, having a first terminal, a second terminal and a control terminal, wherein the control terminal of the second switch receives the first control signal or the second control signal correspondingly and turns on or off the second switch accordingly, the first terminal of the second switch is coupled to the output terminal of the third inverter, and the second terminal of the second switch is coupled to the first terminal of the first switch;

a fourth inverter, having an input terminal and an output terminal, wherein the input terminal of the fourth inverter is coupled to the first terminal of the second switch; and a fifth inverter, having an input terminal and an output terminal, wherein the input terminal of the fifth inverter is coupled to the output terminal of the fourth inverter, and the output terminal of the fifth inverter is coupled to the input terminal of the first inverter.

6. The RTC IC according to claim 1, wherein the lookup table records a characteristic curve of the standard clock without the frequency drift corresponding to the current operation voltage of the adjustable low-power oscillator under a normal or an abnormal temperature.

7. The RTC IC according to claim 1, wherein the adjustable low-power oscillator comprises a ring oscillator, a RC oscillator, or a relaxation oscillator.

8. An electronic apparatus, comprising:

a RTC IC, comprising:

a low-power oscillator, for providing a standard clock, wherein the standard clock produces a frequency drift corresponding to a current operation voltage, a current operation temperature, or a current operation humidity of the low-power oscillator;

a real time counter, for counting a first counting number according to the standard clock without the frequency drift so as to obtain a constant counting time, and producing a detection signal timely; and a control unit, coupled to the low-power oscillator and the real time counter, for detecting the current operation voltage, the current operation temperature, or the current operation humidity of the low-power oscillator when the control unit receives the detection signal, and locating the standard clock without the frequency drift corresponding to the current operation voltage, the current operation temperature, or the current operation humidity of the low-power oscillator in a lookup table to determine whether or not the frequency drift is produced by a current standard clock of the low-power oscillator, wherein if the frequency drift is produced by the current standard clock of the low-power oscillator, the real time counter counts a second counting number or a third counting number so as to obtain the constant counting time; and a temperature detector, coupled to the low-power oscillator and the real time counter, for detecting the current operation temperature of the low-power oscillator when the temperature detector receives the detection signal; and a humidity detector, coupled to the low-power oscillator and the real time counter, for detecting the current operation humidity of the low-power oscillator when the humidity detector receives the detection signal.

9. The electronic apparatus according to claim 8, wherein the control unit comprises:

a voltage detector, coupled to the low-power oscillator and the real time counter, for detecting the current operation voltage of the low-power oscillator when the voltage detector receives the detection signal;

a lookup unit with the lookup table, coupled to the voltage detector, the temperature detector and the humidity detector, for locating the standard clock without the frequency drift corresponding to the current operation voltage, the current operation temperature, or the current operation humidity of the low-power oscillator in the lookup table; and a compensation unit, coupled to the lookup unit, the low-power oscillator and the real time counter, for determining whether or not the frequency drift is produced by the current standard clock of the low-power oscillator according to the standard clock without the frequency drift corresponding to the current operation voltage, the current operation temperature, or the current operation humidity of the low-power oscillator, wherein when the standard clock with the frequency drift is higher than the standard clock without the frequency drift, the real time counter counts the second counting number so as to obtain the constant counting time, and when the standard clock with the frequency drift is lower than the standard clock without the frequency drift, the real time counter counts the third counting number so as to obtain the constant counting time, wherein the second counting number is greater than the first counting number, and the third counting number is smaller than the first counting number.

10. The electronic apparatus according to claim 9, wherein the RTC IC further comprises an interface bus, coupled to the lookup unit, the compensation unit, and the real time counter, for synchronously or asynchronously setting to the lookup unit, the compensation unit and the real time counter by an electronic apparatus system with a microprocessor according to a standard serial transmission protocol.

11. The electronic apparatus according to claim 10, wherein the interface bus comprises an I²C bus, a SPI bus, a microwire interface bus, or a CAN bus.

12. The electronic apparatus according to claim 8, wherein the lookup table records a plurality of characteristic curves of the standard clock without the frequency drift corresponding to the current operation voltage, the current operation temperature, and the current operation humidity of the low-power oscillator under a normal or an abnormal temperature.

13. The electronic apparatus according to claim 8, wherein the low-power oscillator comprises a ring oscillator, a RC oscillator, or a relaxation oscillator.

14. An electronic apparatus, comprising:
a RTC IC, comprising:
an adjustable low-power oscillator, for providing a standard clock, wherein the standard clock produces a frequency drift corresponding to a current operation voltage, a current operation temperature, or a current operation humidity of the adjustable low-power oscillator;
a real time counter, coupled to the adjustable low-power oscillator, for counting a first counting number according to the standard clock without the frequency drift so as to obtain a constant counting time, and producing a detection signal timely; and
a control unit, coupled to the adjustable low-power oscillator and the real time counter, for detecting the current operation voltage, the current operation temperature, or the current operation humidity of the adjustable low-power oscillator when the control unit receives the detection signal, and locating the standard clock without the frequency drift corresponding to the current operation voltage, the current operation temperature, or the current operation humidity of the adjustable low-power oscillator in a lookup table to determine whether or not the frequency drift is produced by a current standard clock of the adjustable low-power oscillator, wherein if the frequency drift is produced by the current standard clock of the adjustable low-power oscillator, the control unit produces a first control signal or a second control signal correspondingly to make the current standard clock of the adjustable low-power oscillator become the standard clock without the frequency drift corresponding to the current operation voltage of the adjustable low-power oscillator, and the real time counter counts the first counting number so as to obtain the constant counting time accordingly; and
a temperature detector, coupled to the adjustable low-power oscillator and the real time counter, for detecting the current operation temperature of the adjustable low-power oscillator when the temperature detector receives the detection signal; and
a humidity detector, coupled to the adjustable low-power oscillator and the real time counter, for detecting the current operation humidity of the adjustable low-power oscillator when the humidity detector receives the detection signal.

15. The electronic apparatus according to claim 14, wherein the control unit comprises:
a voltage detector, coupled to the adjustable low-power oscillator and the real time counter, for detecting the current operation voltage of the adjustable low-power oscillator when the voltage detector receives the detection signal; and
a lookup unit with the lookup table, coupled to the voltage detector, the temperature detector, the humidity detector and the adjustable low-power oscillator, for locating the standard clock without the frequency drift corresponding to the current operation voltage, the current operation temperature, or the current operation humidity of the adjustable low-power oscillator in the lookup table, and producing the first control signal or the second control signal correspondingly.

16. The electronic apparatus according to claim 15, wherein the RTC IC further comprises an interface bus, coupled to the lookup unit and the real time counter, for synchronously or asynchronously setting to the lookup unit and the real time counter by an electronic apparatus system with a microprocessor according to a standard serial transmission protocol.

17. The electronic apparatus according to claim 16, wherein the interface bus comprises an I²C bus, a SPI bus, a microwire interface bus, or a CAN bus.

18. The electronic apparatus according to claim 14, wherein the adjustable low-power oscillator comprises:
a first switch, coupled to the lookup unit, having a first terminal, a second terminal and a control terminal, wherein the control terminal of the first switch receives the first control signal or the second control signal correspondingly and turns on or off the first switch accordingly;
a first inverter, having an input terminal and an output terminal, wherein the input terminal of the first inverter is coupled to the first terminal of the first switch;
a second inverter, having an input terminal and an output terminal, wherein the input terminal of the second inverter is coupled to the output terminal of the first inverter, and the output terminal of the second inverter is coupled to the second terminal of the first switch; and
a third inverter, having an input terminal and an output terminal, wherein the input terminal of the third inverter is coupled to the output terminal of the second inverter, and the output terminal of the third inverter is coupled to the input terminal of the first inverter.

19. The electronic apparatus according to claim 18, wherein the adjustable low-power oscillator further comprises:
a second switch, coupled to the lookup unit, the second switch having a first terminal, a second terminal and a control terminal, wherein the control terminal of the second switch receives the first control signal or the second control signal correspondingly and turns on or off the second switch accordingly, the first terminal of the second switch is coupled to the output terminal of the third inverter, and the second terminal of the second switch is coupled to the first terminal of the first switch;
a fourth inverter, having an input terminal and an output terminal, wherein the input terminal of the fourth inverter is coupled to the first terminal of the second switch; and
a fifth inverter, having an input terminal and an output terminal, wherein the input terminal of the fifth inverter is coupled to the output terminal of the fourth inverter, and the output terminal of the fifth inverter is coupled to the input terminal of the first inverter.

20. The electronic apparatus according to claim 14, wherein the lookup table records a plurality of characteristic curves of the standard clock without the frequency drift corresponding to the current operation voltage, the current operation temperature, and the current operation humidity of the adjustable low-power oscillator under a normal or an abnormal temperature.

21. The electronic apparatus according to claim 14, wherein the adjustable low-power oscillator comprises a ring oscillator, a RC oscillator, or a relaxation oscillator.

* * * * *